United States Patent [19]

Nagano

[11] 4,325,269

[45] Apr. 20, 1982

[54] WIRE GUIDE FOR A BICYCLE

[75] Inventor: Masashi Nagano, Sakai, Japan

[73] Assignee: Shimano Industrial Company Limited, Osaka, Japan

[21] Appl. No.: 119,137

[22] Filed: Feb. 6, 1980

[30] Foreign Application Priority Data

Feb. 20, 1979 [JP] Japan .......................... 54/21227[U]

[51] Int. Cl.³ .............................................. F16C 1/00
[52] U.S. Cl. .............................. 74/501 R; 280/289 R; 474/140; 254/389
[58] Field of Search ...................... 74/501 R, 487, 489; 280/289 R, 289 G; 474/140, 144; 254/389

[56] References Cited

U.S. PATENT DOCUMENTS

| | | | |
|---|---|---|---|
| 3,830,115 | 8/1974 | Juy | 74/501 R |
| 3,835,729 | 9/1974 | Tarutani | 474/144 |
| 4,156,373 | 5/1979 | Juy | 74/501 R |

Primary Examiner—Kenneth Dorner
Attorney, Agent, or Firm—Stevens, Davis, Miller & Mosher

[57] ABSTRACT

A wire guide is mounted with a bottom bracket at a bicycle and has a guide body having a guide groove, a support extending from the guide body axially of the bottom bracket, and a fixture narrow in width and of a circular arc shape, the fixture being provided in continuation of the extending end of support and approximately perpendicular thereto, so that one threaded bearing tubular member is screwed with one axial end of the bottom bracket to thereby fix the fixture thereto.

2 Claims, 6 Drawing Figures

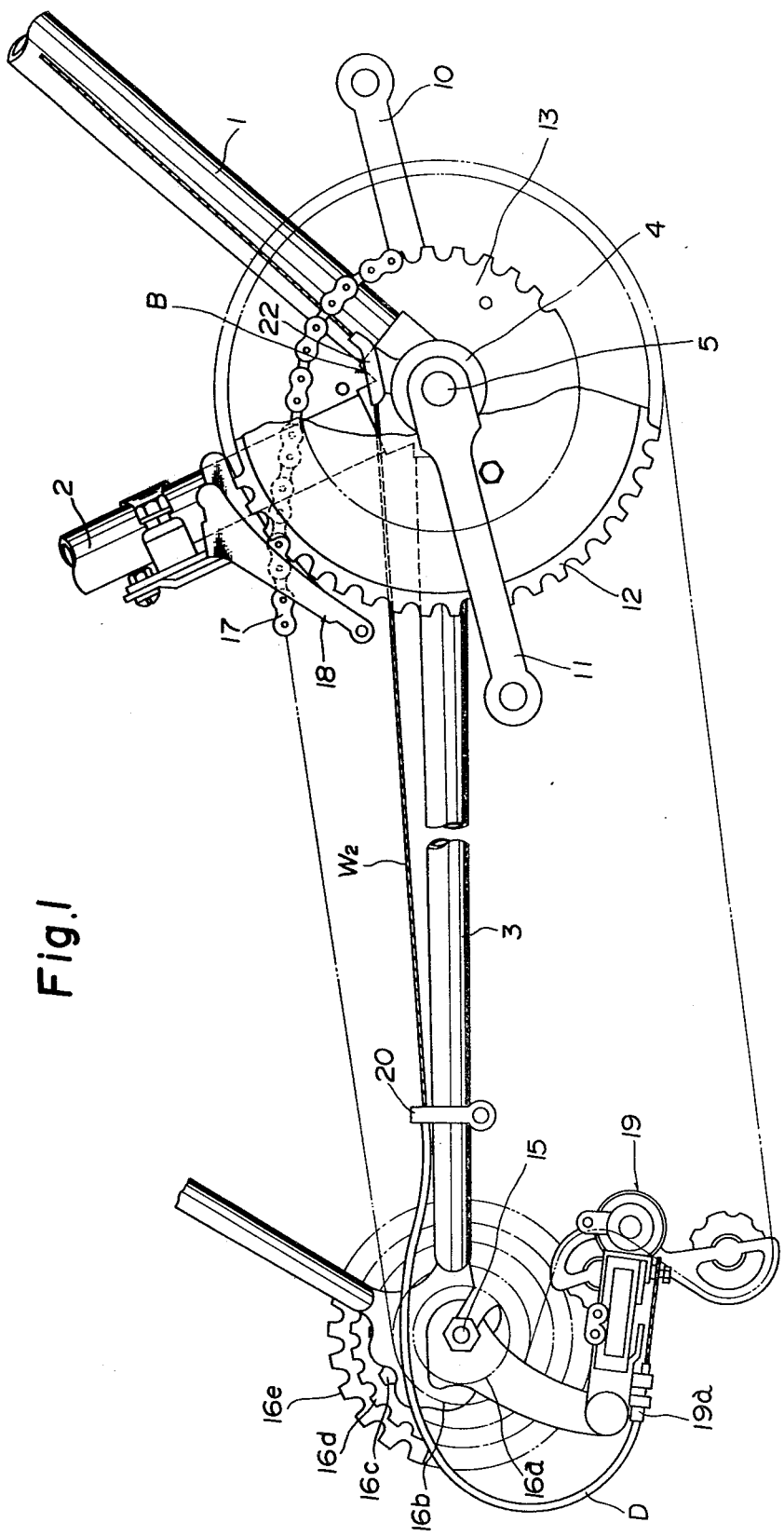

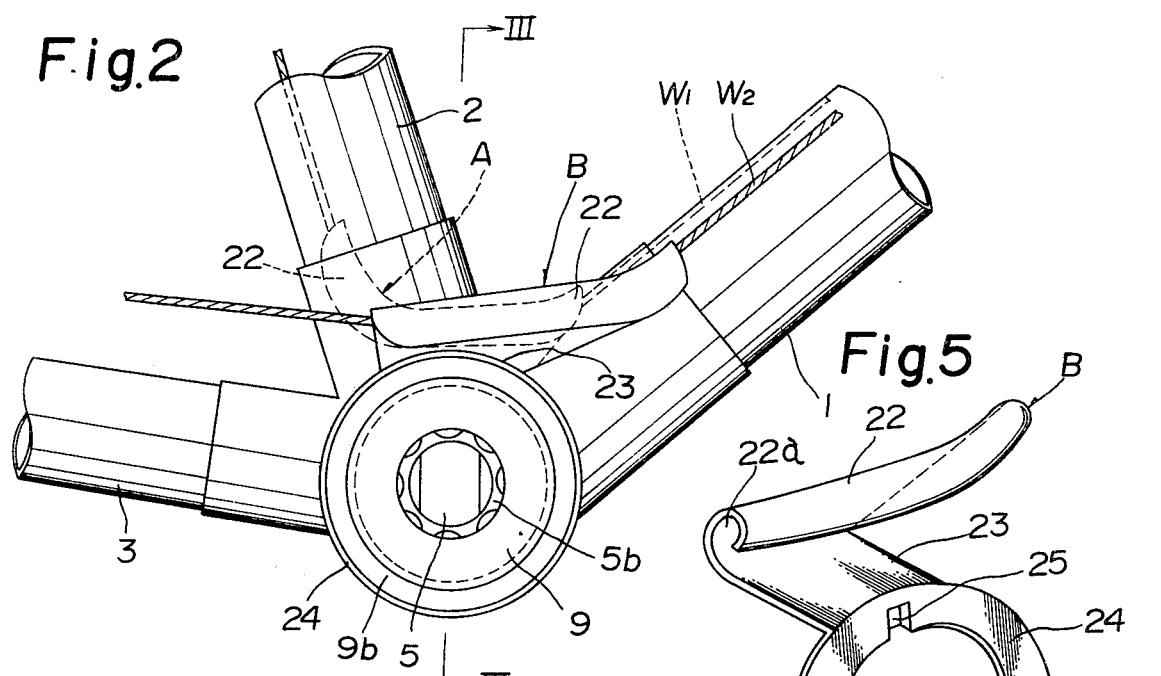
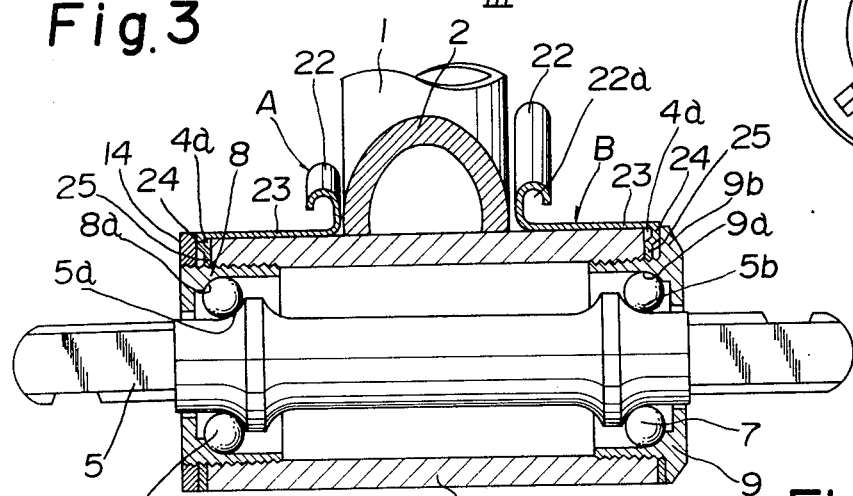
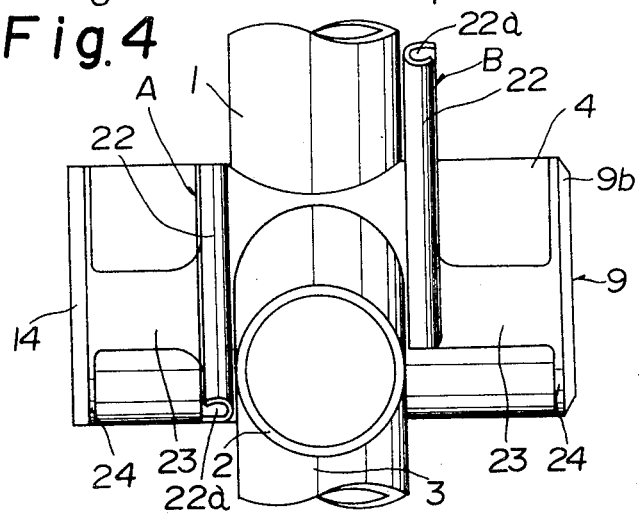
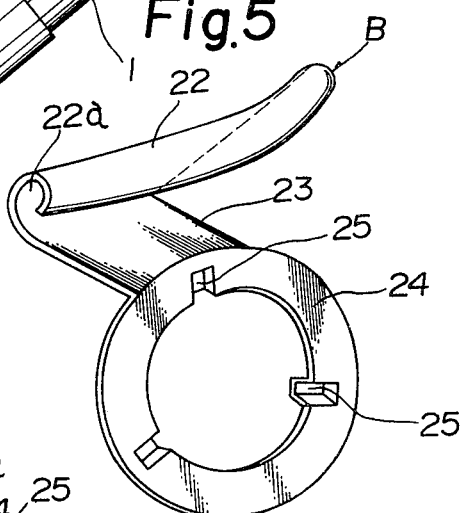
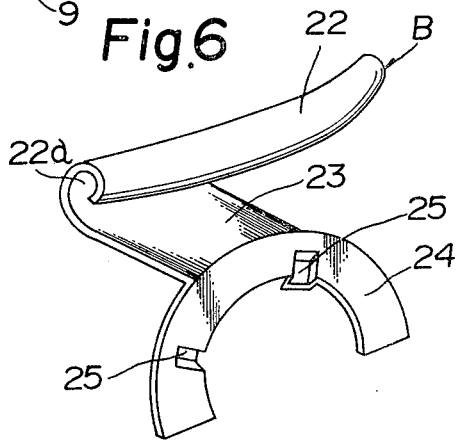

WIRE GUIDE FOR A BICYCLE

BACKGROUND AND SUMMARY OF THE INVENTION

This invention relates to a wire guide for a bicycle, and more particularly to a wire guide mounted to the bicycle frame near a bottom bracket. The bottom bracket is used to connect a down tube, seat tube and chain stay of the bicycle frame, and formed in a cylindrical shape to insertably support a crank shaft through a pair of bearings, which are usually supported by threaded tubular members screwed with the bottom bracket.

Generally, some bicycles have front chain wheels and/or rear chain wheels formed in multi-stage chain wheels comprising a plurality of chain wheels of different diameters, and derailleurs provided in the vicinity of the front and/or rear chain wheels. The derailleurs are connected through control wires to control levers mounted to a handle bar or down tube at the bicycle, so that the levers are operated to control the respective derailleurs to thereby switch a driving chain to each of the different diameter chain wheels, thus changing the bicycle speed in multi-stages.

The bicycle constructed as foregoing is provided at the frame in the vicinity of the bottom bracket with wire guides for guiding the control wires extending from the levers to the derailleurs respectively.

The wire guide is conventionally mounted to the frame mostly by welding. Such a mounting method, however, is troublesome and difficult to mount the wire guide in position because the wire guide, when mounted, is apt to shift. Furthermore, it is impracticable to renew the guide after once mounted even when it wears due to friction from the wire operation.

On the other hand, there is a wire guide having mounting means of a band type and mounted therethrough to the frame, in which the wire guide has a complicated construction, is expensive to manufacture, and difficult in mounting.

In light of these problems, this invention has been designed. An object of the invention is to provide a wire guide which is simple in construction, mountable simply and accurately in position near the bottom bracket, and easily replaceable when worn.

The inventor has recognized that at both axial ends of the bottom bracket are screwed threaded tubular members for carrying a crank shaft, and designed to make use of the threaded tubular members for mounting the wire guides to the bottom bracket. The wire guide comprises a guide body having a guide groove, a support extending from the guide body axially of the bottom bracket, and a fixture provided at the end of the extending support and in continuation thereof, the fixture being narrow in width and of circular arc and approximately perpendicular to the direction of the extending support. The fixture, when the threaded tubular member is screwed with the bottom bracket, is fixedly sandwiched between one axial end face thereof and the screwed threaded tubular member or lock nut screwed therewith.

Accordingly, the present invention is capable of simply mounting the wire guide and keeping the guide groove in position without using conventional welding or bands.

These and other objects and novel features of the invention will be more apparent from the following description of an embodiment of the invention in accordance with the accompanying drawings.

BRIEF DESCRIPTION OF THE INVENTION

FIG. 1 is a partial side view of a bicycle providing a wire guide of the invention, FIG. 2 is a side view of an enlarged mounting portion of the wire guide in FIG. 1, omitting the crank and front chain wheels which are not related to the invention, FIG. 3 is a sectional view taken on the line III—III in FIG. 2, FIG. 4 is a plan view of the mounting portion in FIG. 2, FIG. 5 is a perspective view of the wire guide only, and FIG. 6 is a perspective view of a wire guide of a modified embodiment of the invention.

DETAILED DESCRIPTION OF THE INVENTION

Referring to FIG. 1, the wire guide of the invention, which is used in the bicycle, is mounted in the vicinity of a bottom bracket 4 at a joint or lug for connecting a down tube 1, a seat tube 2 and a chain stay 3.

Firstly, the construction shown in FIG. 1 will be detailed for an overview of the wire guide of the invention.

The bottom bracket 4, as well-known, is cylindrical and has a crank shaft 5 perforating therethrough. The crank shaft 5 is supported rotatably to the bottom bracket 4 through a pair of bearings 6 and 7 of balls and threaded tubular members 8 and 9 carrying the ball bearings 6 and 7.

In greater detail, at the inner peripheries of both axial ends of bottom bracket 4 are provided screw threads with which the threaded tubular members 8 and 9 are screwed, and the ball bearings 6 and 7 are interposed between ball races 5a and 5b at the crank shaft 5 and ball races 8a and 9a at the threaded tubular members 8 and 9, so that the crank shaft 5 may be supported rotatably to the bottom bracket 4 as shown in FIG. 3.

The crank shaft 5 is provided at both axial ends thereof with a pair of right-hand and left-hand crank arms 10 and 11, the right-hand crank arm carrying at the inside thereof two front chain wheels 12 and 13 of different diameters. In addition, a lock nut 14 is screwed with the outer periphery at the axially outward portion of one threaded tubular member 8 and a flange 9b is provided at the other tubular member 9, thereby locking both the threaded tubular members 8 and 9.

At the rear end of chain stay 3 is journaled a rear wheel shaft 15, onto which five rear chain wheels 16a to 16e of different diameters are mounted.

An endless chain 17 is stretched across the front and rear chain wheels. A front derailleur 18 is mounted to the lower portion of seat tube 2 and a rear derailleur 19 to the rear wheel shaft 15, the respective derailleurs 18 and 19 being operated to switch the chain 17 to a selected one of the front or rear chain wheels.

The front and rear derailleurs 18 and 19 and control levers (not shown) mounted to the down tube or handle bar, are connected through control wires $W_1$ and $W_2$, the wires $W_1$ and $W_2$ being guided by the wire guides of the invention respectively.

In addition, in FIG. 1, an outer sheath O for guiding the wire $W_2$ is provided to be supported at one end to a holder 20 mounted to the rear side of chain stay 3 and at the other end to an outer stop 19a provided at the rear derailleur 19.

Next, the wire guide of the invention will be described.

Fixing of the wire guide to the bottom bracket 4 constructed as foregoing utilizes screwable attachment of the threaded tubular members 8 and 9 to the bottom bracket 4. Referring to the drawings, two wire guides A and B are mounted at both axial ends of bottom bracket 4 in order to guide two control wires $W_1$ and $W_2$ for the front and rear derailleurs 18 and 19 respectively.

The two wire guides A and B are basically the same in construction and comprise each a guide body 22, a support 23 extending axially of the bottom bracket 4, and a fixture 24 narrow in width, of circular arc and in continuation of an end of the extending support 23 as shown in FIG. 5.

The guide body 22 has a guide groove 22a for guideing therethrough the wires $W_1$ and $W_2$, the guide groove 22a being in continuation of the support 23.

The guide groove 22a is not particularly defined in its shape. But, the guide groove 22a at the wire guide A guiding the control wire $W_1$ for the front derailleur 18 is directed at its front end to the down tube 1 and is raised at the rear end to extend axially of the seat tube 2 as shown in FIG. 2. The guide groove 22a at the wire guide B guiding the control wire $W_2$ for the rear derailleur 19 is directed at its front end axially of the down tube 1 and extended at the rear end axially of the chain stay 3 as shown in FIG. 2.

The fixture 24 is integral with the end of the extending support 23 and extending about perpendicular thereto.

Also, the fixture 24, as shown in FIGS. 3 and 5, is formed of a ring plate of a circumferential portion narrow in width and its inner diameter is made equal to or slightly larger than an inner diameter of bottom bracket 4 and opposite to one axial end face thereof.

In the aforesaid construction, when the crank shaft 5 is supported to the bottom bracket 4, the fixtures 24 at the wire guides A and B are fit onto the threaded tubular members 8 and 9 respectively and the threaded tubular members 8 and 9 are screwed with the bottom bracket 4 to thereby mount the wire guides A and B thereto. In detail, the wire guide A, as shown in FIG. 3, is fixed to the bottom bracket 4 through its fixture 24 sandwiched between a lock nut 14 screwed with the tubular member 8 and the axially left-hand end face of bottom bracket 4, and the wire guide B, as shown in FIG. 3, is fixed through its fixture 24 sandwiched between the flange 9b of tubular member 9 and the axially right-hand end face of bottom bracket 4.

In addition, the fixtures 24 may each have the flat ring plate only, but are preferred to have a plurality (three in FIG. 5) of projections 25 extending axially inwardly of the bottom bracket 4 and locally disposed as shown in FIG. 5. In this instance, it is preferable to provide at both axial end faces of bottom bracket 4 recesses 4a receiving therein the projections 25 respectively. Hence, the projections 25 are fit into the recesses 4a, and the threaded tubular members 8 and 9 and lock nut 14 are tightened, thereby ensuring that the wire guides A and B are prevented from careless rotation.

Alternatively, the fixture 24, as shown in FIG. 6, may be cut off at a portion diametrical to the joint with the support 23 so as to be a semicircular ring plate cut in half. Such a fixture 24 of ring plate cut in half can be fit onto the threaded tubular member 8 or 9 which is in condition for screwing with the bottom bracket 4, thereby further facilitating mounting or dismounting of the wire guides to or from the bottom bracket 4.

In addition, other than the aforesaid embodiments, when the derailleur 18 or 19 only is provided, the wire guide A or B is mounted to the bottom bracket 4.

As clearly understood from the aforesaid description, the wire guide of the invention is so constructed that the fixture is narrow in width and of circular arc formed integrally with the guide body through the support and is fixedly mounted to the bottom bracket by use of the threaded tubular member including the lock nut, screwed with the bottom bracket. Hence, the wire guide of the invention can be mounted to the bicycle frame more simply and accurately in comparison with the conventional wire guide mounted by means of welding or a tightening band. Furthermore, the wire guide, when its body wears due to the control wire, is easily renewable by removing or releasing the threaded tubular member.

While an embodiment of the invention has been shown and described, the invention is not limited to the specific construction thereof, which is merely exemplified in the specification rather than defined.

What is claimed is:

1. A wire guide for mounting with a bottom bracket of a bicycle, said bottom bracket supporting a crank shaft and provided with threaded bearing tubular members for supporting said crank arm, said wire guide comprising, a guide body, said guide body having a guide groove for guiding therethrough a control wire for a derailleur at the bicycle and having a support extending from said guide groove axially of said bottom bracket, a fixture provided in continuation of the extending end of said support at said guide body, said fixture comprising a ring plate having a narrow width and circular arc, having an inner periphery of a larger diameter than an inner diameter of said bottom bracket, being approximately perpendicular to the direction of said extending end, and being opposite to one axial end face of said bottom bracket, so that said threaded tubular member is screwed with said bottom bracket to thereby fix said fixture to said bottom bracket, said ring plate including a plurality of projections extending axially of said bracket.

2. A wire guide according to claim 1, wherein said fixture is formed of a ring plate cut in half and of a semicircular arc portion narrow in width.

* * * * *